US00RE36976E

United States Patent [19]

Bezner

[11] E Patent Number: Re. 36,976

[45] Reissued Date of Patent: Dec. 5, 2000

[54] LIGHT TRANSMITTING WALL PANELS

[75] Inventor: Baruch J. Bezner, Tel-Aviv, Israel

[73] Assignee: Dan-Pal, Upper Galilee, Israel

[21] Appl. No.: 08/718,723

[22] Filed: Sep. 24, 1996

Related U.S. Patent Documents

Reissue of:

[64] Patent No.: 4,573,300
Issued: Mar. 4, 1986
Appl. No.: 06/310,422
Filed: Oct. 9, 1981

[30] Foreign Application Priority Data

Oct. 20, 1980 [IL] Israel ..... 61314

[51] Int. Cl.[7] ..... E04B 1/02

[52] U.S. Cl. ..... 52/563; 52/413; 52/581

[58] Field of Search ..... 52/563, 569, 581, 52/568, 481.2, 413, 762, 763, 562, 790.1, 202, 799.1

[56] References Cited

U.S. PATENT DOCUMENTS

| | | | |
|---|---|---|---|
| 1,141,445 | 6/1915 | Davison | 52/568 X |
| 2,292,351 | 8/1942 | Meginnity | 52/762 |
| 2,312,994 | 3/1943 | Weitzel | 52/762 X |
| 2,841,255 | 7/1958 | Kemp | 52/762 X |
| 3,002,591 | 10/1961 | Hess | 52/762 |
| 3,022,869 | 2/1962 | Radek | 52/762 X |
| 3,046,852 | 7/1962 | Graham | 52/581 |
| 3,257,758 | 6/1966 | Johnson | 49/463 |
| 3,290,850 | 12/1966 | Byrne et al. | 52/309.1 |
| 3,299,595 | 1/1967 | Munk | 52/799 |
| 3,386,221 | 6/1968 | Giovannucci | 52/588 X |
| 3,421,276 | 1/1969 | La Barge | 52/309.1 X |
| 3,984,961 | 10/1976 | Chieger et al. | 52/593 |
| 4,035,539 | 7/1977 | Luboshez | 52/799 |
| 4,057,936 | 11/1977 | Wyatt | 52/799 |
| 4,084,272 | 4/1978 | Laven | 52/588 X |
| 4,193,232 | 3/1980 | Almsted et al. | 52/202 |
| 4,222,210 | 9/1980 | Hanstein et al. . | |
| 4,223,493 | 9/1980 | Moench et al. | 52/200 |
| 4,242,849 | 1/1981 | Benkelman et al. | 52/200 |
| 4,299,070 | 11/1981 | Oltmanns et al. | 52/568 X |
| 4,332,119 | 6/1982 | Toews | 52/568 |

FOREIGN PATENT DOCUMENTS

| | | | |
|---|---|---|---|
| 0006431 | 6/1970 | European Pat. Off. . | |
| 1007773 | 5/1952 | France | 52/568 |
| 812130 | 7/1949 | Germany . | |
| 1609777 | 4/1970 | Germany . | |
| 7045759 | 3/1971 | Germany . | |
| 1759662 | 6/1971 | Germany . | |
| 2125725 | 12/1972 | Germany . | |
| 2243972 | 4/1973 | Germany . | |
| 2527013 | 2/1976 | Germany . | |
| 7716036 | 5/1977 | Germany . | |
| 2752286 | 5/1979 | Germany . | |
| 2802181 | 7/1979 | Germany | 52/306 |
| 2808155 | 8/1979 | Germany . | |
| 482747 | 6/1939 | United Kingdom | 52/799 |
| 814250 | 6/1959 | United Kingdom . | |
| 1401057 | 7/1975 | United Kingdom . | |
| 2081770 | 3/1984 | United Kingdom . | |

*Primary Examiner*—Creighton Smith
*Attorney, Agent, or Firm*—Frank J. Benasutti

[57] ABSTRACT

There is provided an extruded, modular panel unit for the construction of wall-surface portions, especially of light-transmitting wall-surface portions. The panel comprises two sheet-like major surfaces interconnected and spaced apart by a plurality of web-like ribs dividing the space delimited by the major surfaces into a plurality of subspaces, and at least one joining flange extending in the direction of extrusion and projecting at an angle from an edge of the panel unit. In cross section, the sheet-like major surfaces and the ribs form a truss-like structure of which the major surfaces constitute the chords and the ribs constitute the webs.

6 Claims, 6 Drawing Sheets

21
24'
30
24
28
28
24'
24

21
4
2

21
2
4
4
2

16
32
10
8
6
4
2
34
24
26
24

32
16
34
36
26

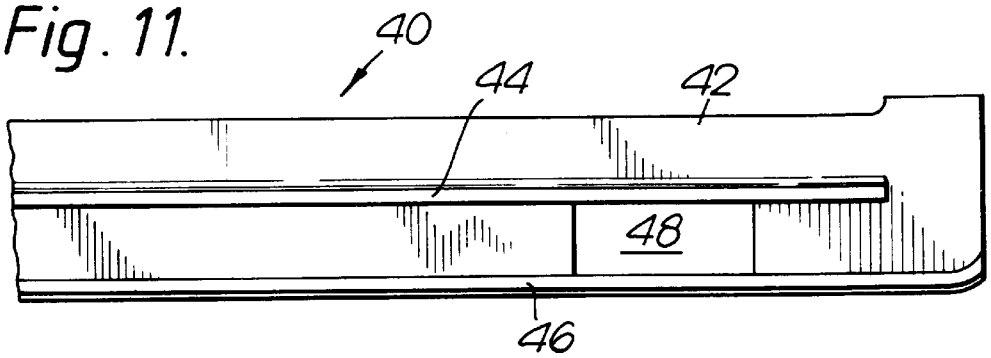
Fig. 11.
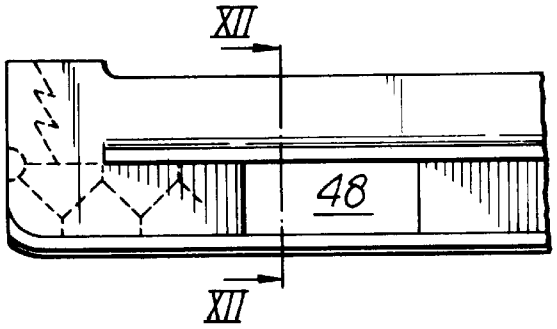
Fig. 12.
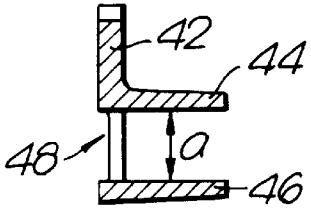
Fig. 13.
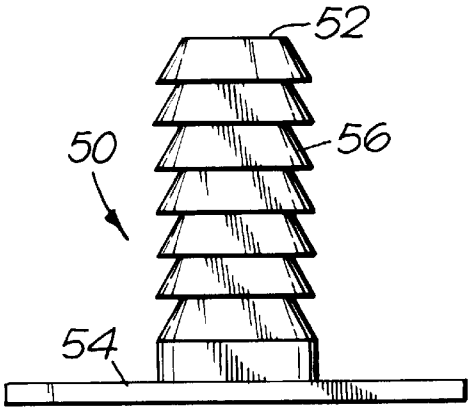
Fig. 14.
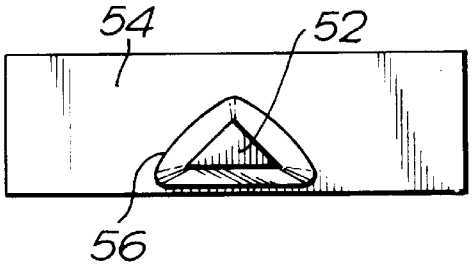

LIGHT TRANSMITTING WALL PANELS

Matter enclosed in heavy brackets [ ] appears in the original patent but forms no part of this reissue specification; matter printed in italics indicates the additions made by reissue.

*This application is a reissue of application Ser. No. 06/310,422, filed Oct. 9, 1981, now U.S. Pat. No. 4,573,300, issued Mar. 4, 1986.*

The present invention relates to an extruded, modular panel unit for the construction of wall sections, particularly of light-transmitting wall sections such as windows, especially in industrial structures.

While the traditional material for windows, glass, has several advantages such as high transmissivity when clean and being easily cleaned when dirty, good weathering properties and a relatively low coefficient of thermal conduction, its disadvantages are, however, numerous and weighty. It is fragile and liable to fracture not only under gross impact, but also spontaneously due to thermal stress, or mechanical stresses caused by warping of thermal expansion or contraction of its metal mounting. Standard window glass cannot be used beyond a certain size (unless, at substantial costs, the metal or wood frame is suitably subdivided), and thicker glass is very heavy and quite expensive. Wire-reinforced glass, while not as easily smashed as ordinary glass, is not crackproof. Also, single-pane windows do not afford sufficient thermal insulation, especially with large glazed surfaces, and double-pane windows, that is, windows including an insulative air layer, are very expensive. The so-called U-glass windows, for instance, consist of one surface constituted by juxtaposed channel sections made of glass, the open faces of which sections are covered by another such surface, the wings of which channel sections each penetrate the open faces of the opposite channel sections. While, if properly mounted, this type of glazing is quite effective as thermal insulation, it is also extremely heavy, requires careful sealing and is altogether very expensive.

Plastic insulative glazing has also been used. One type, known as "Qualex", consist of two extruded sheets of a plastic material integrally connected by ribs perpendicular with respect to the sheets, producing a plurality of air spaces of a rectangular cross section. However, not only is this type of panel very expensive, partly because of the relatively small enclosed air volume/plastic mass ratio, but, more important, no provision is made for edge-wise joining of two or more panels which, being extrusions, are of a limited width only.

It is one of the objects of the present invention to overcome these and other disadvantages and drawbacks of the prior-art glazing and to provide a glazing which is extremely light-weight and, therefore, relatively inexpensive, is practically unbreakable and, having integral air spaces, is inherently thermally insulative. Also, being of a modular design, the panel units according to the invention can be joined edge-wise to form windows of any width.

This the present invention achieves by providing an extruded, modular panel unit for the construction of wall-surface portions, especially of light-transmitting wall-surface portions, comprising at least two sheet-like major surfaces interconnected and spaced apart by a plurality of web-like ribs dividing the space delimited by said major surfaces into a plurality of subspaces, and at least one joining flange extending in the direction of extrusion and projecting at an angle from an edge of said panel unit, wherein, in cross section, said sheet-like major surfaces and said ribs form a truss-like structure of which said major surfaces constitute the chords and said ribs constitute the webs.

It is further advantage of the panel unit according to the invention that, using a different embodiment of the joining member, it is possible to construct "double windows" which, in addition to the integral air spaces of each panel in itself, provide an additional insulative air space between the opposite panels of the double-window system.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 11 is a top view of a reinforcing rail for the panel unit according to the invention;

FIG. 12 is a side view, in cross section along plane XII—XII of FIG. 11, of the reinforcing rail of FIG. 11;

FIG. 13 shows a front view of a peg for fastening the rail of FIG. 11 to the panel;

FIG. 14 is a top view of the peg of FIG. 13;

Figure 1:
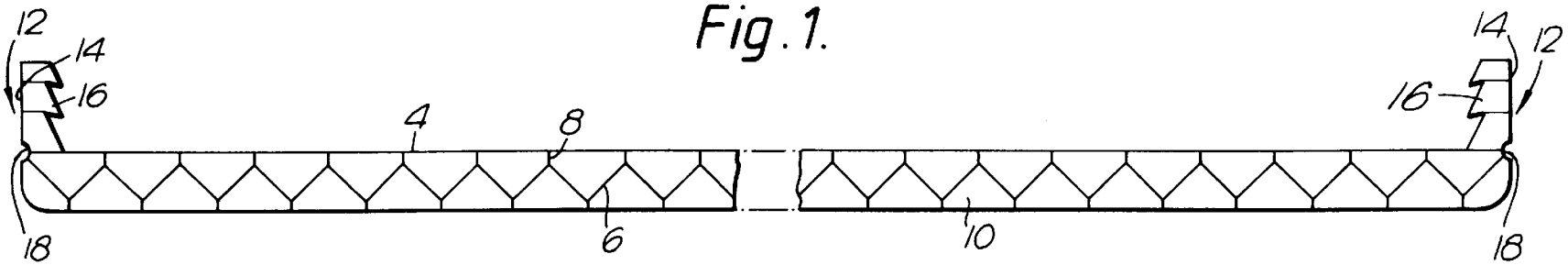
FIG. 1 shows a partial, cross-sectional view of the panel according to the invention.

There is seen in FIG. 1 a cross-sectional view of a preferred embodiment of the panel unit according to the invention, showing two sheet-like major surfaces 2 and 4 interconnected and spaced by a plurality of main ribs 6 and auxilliary ribs 8, which ribs divide the space delimited by the two major surfaces 2 and 4 into a plurality of subspaces 10. All these elements form a truss-like structure of which the two major surfaces 2 and 4 constitute the chords and the ribs 6 and 8 constitute the webs. As can be seen from FIG. 1, the main ribs 6 zigzag between the two major surfaces 2 and 4, being attached to them via the short auxilliary ribs 8 which extend from the inflection points of the zigzagging main ribs 6 to the respectively nearest one of the major surfaces 2 or 4. The purpose of this arrangement is to reduce to a minimum the mass of material at the point of attachment of the ribs to the major surfaces, in order to reduce heat-bridging between the two major surfaces 2 and 4, and thus enhance the insulative properties of the panel. At the same time, these auxilliary ribs 8 being relatively short, the structural reinforcement effect of the main ribs 6 remains substantially unimpaired.

Extending in direction of extrusion, there are provided on both edges of the panel joining flanges 12, projecting in a direction perpendicular to the major surfaces 2 and 4, and having each an outside face 14 designed to contact the outside face 14 (see also FIG. 2) of the flange 12 of an adjacent panel. The inside face of the flanges 12 is provided with tooth-like detent means 16, the precise function of which will become apparent further below. An additional feature of the outside faces 14 of these flanges 12 is a substantially semicircular groove 18 which, in conjunction with a similar groove in the flange 12 of an adjacent panel, constitutes a so-called decompression chamber 20 (FIG. 2) which stops wind action as well as wind-enhanced capillary action through the joint. It is of course also possible to use the chamber 20 to accommodate a mechanical seal.

While in the preferred embodiment described the outside faces 14 of the flanges 12 are smooth, it is also possible to provide them with serrations extending in the direction of extrusion. This would improve the sealing properties of the joint and also provide a positive alignment during, and additional safety after, the application of the joining member 21.

Figure 3:
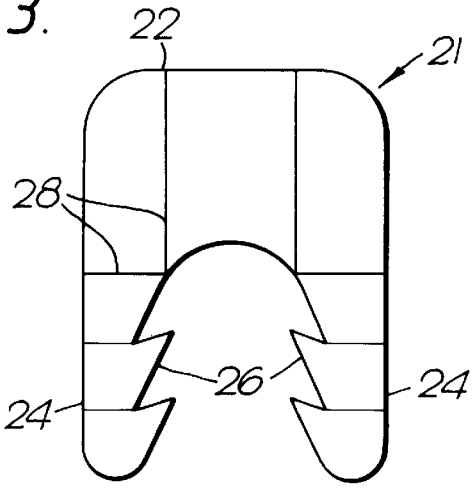
FIG. 3 is a cross-sectional view of a first embodiment of a joining member of the panel unit according to the invention.

The latter is shown in cross section in FIG. 3 and is in the form of a hollow, extruded rail of a basically U-shaped cross section comprising a base portion 22 and two wing portions 24. The insides of these wing portions 24 are provided with detent means 26 engageably matching the detent means 16 of the flange insides. The joining members 21 is stiffened by reinforcing ribs 28.

Figure 2:
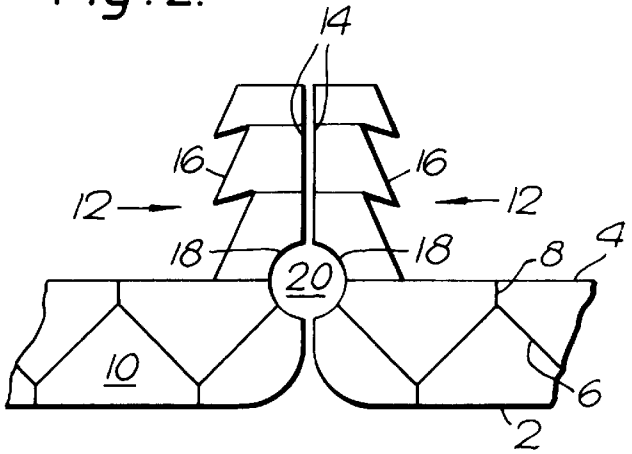
FIG. 2 is a partial, cross-sectional view, enlarged relative to FIG. 1, of the flanges of two adjacent panels, properly aligned and making contact, ready for joining.

Joining of the panels is carried out in the following way: Two panels to be joined are brought into a position of alignment as shown in FIG. 2, after which the joining member 21, facing the paired flanges 12 with its wing side, is pushed over the flanges 12 as far as it will go. It is seen that the detent means 26 and 16 are shaped and oriented in such a way as to facilitate application of the joining member 21 (under slight elastic deformation of the elements involved), while offering resistance to the removal of the joining member 21.

Figures 4, 5, 6, 9, 10:
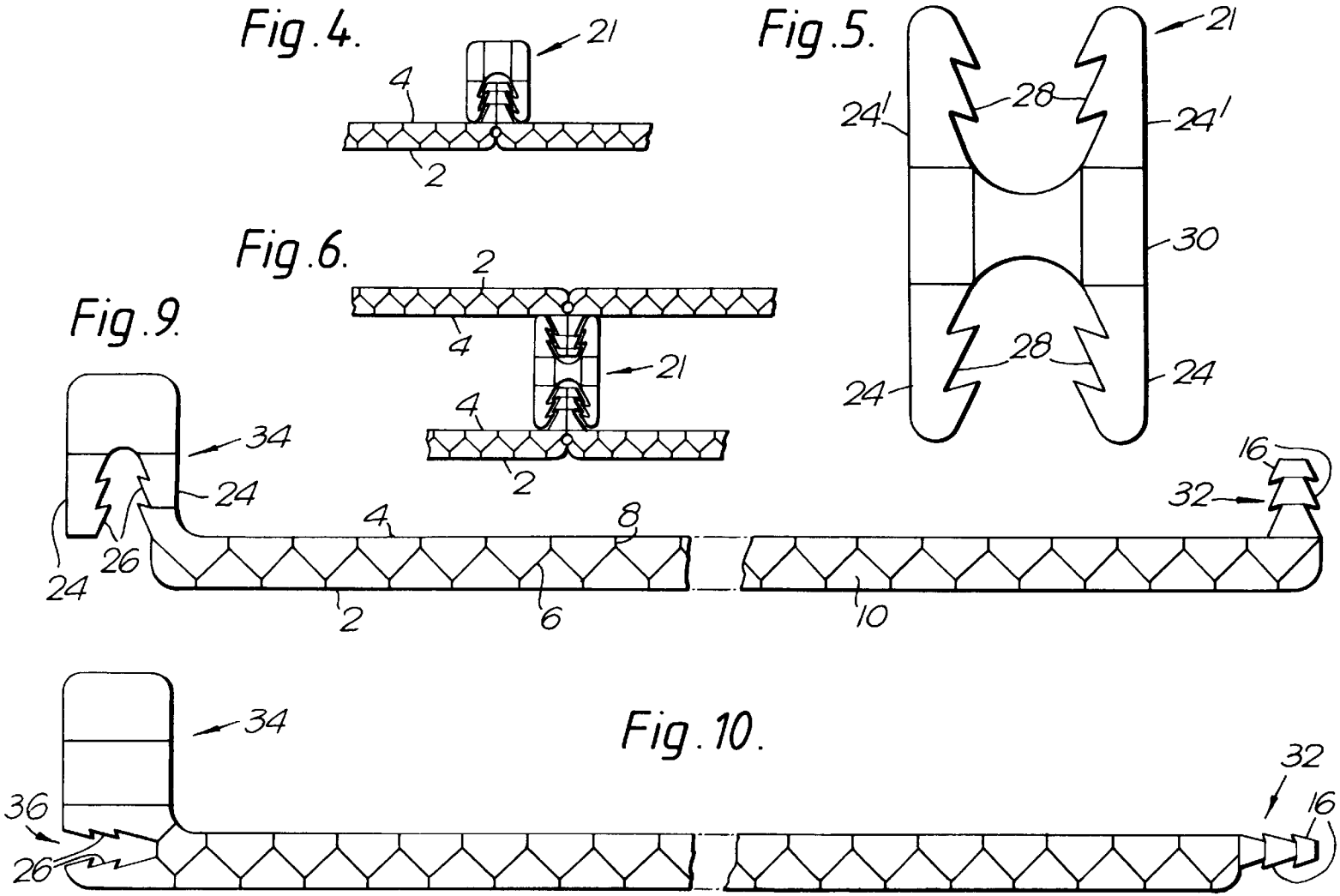
FIG. 4 is a partial, cross-sectional view, reduced relative to FIG. 1, of the two adjacent panels of FIG. 2 and their flanges having been joined by the joining member of FIG. 3.
FIG. 5 is a cross-sectional view of another embodiment of the joining member of the panel unit according to the invention.
FIG. 6 shows a partial view, in cross section, of the "double window" produced with the aid of the embodiment of FIG. 5.
FIGS. 9 and 10 are partial, cross-sectional views of two further embodiments of the panel unit according to the invention, requiring no joining members.
Figure 7:
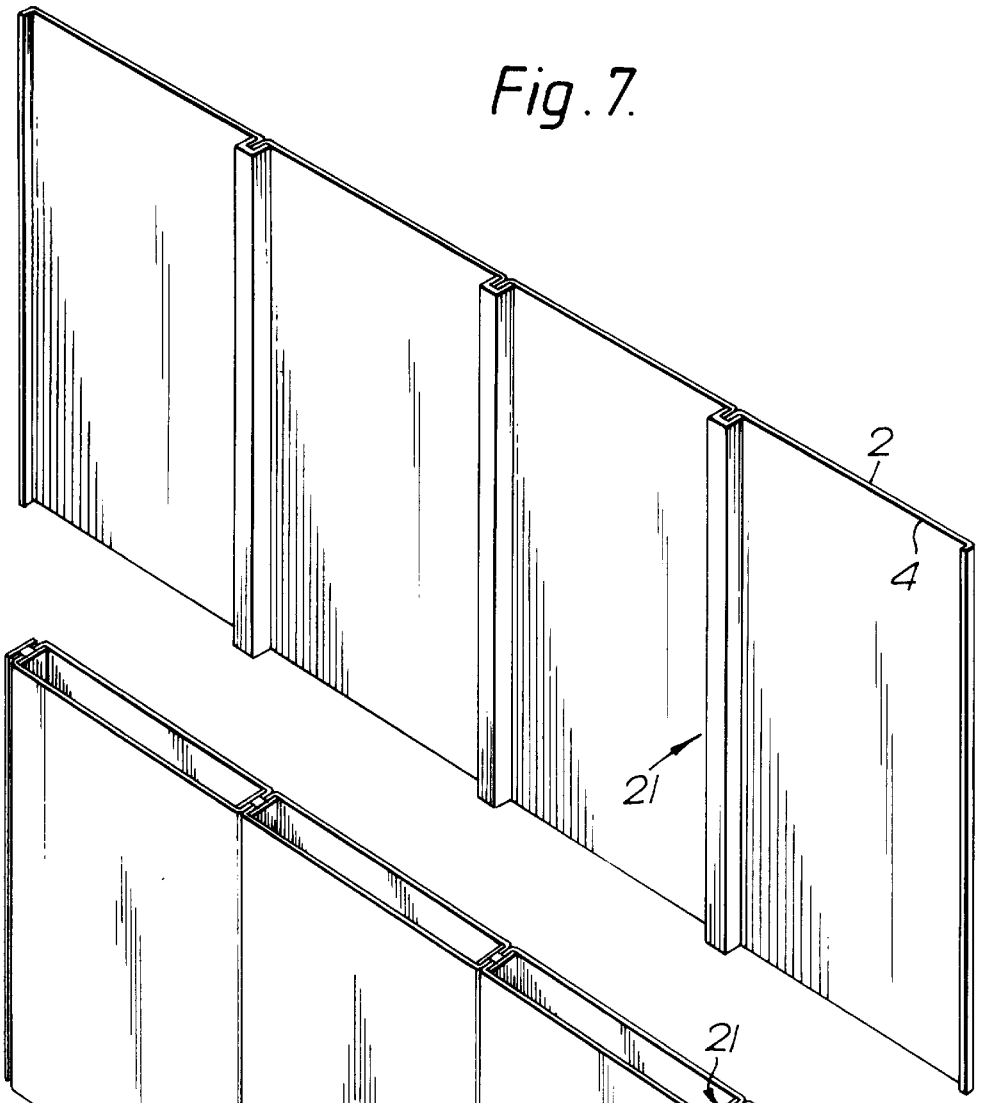
FIG. 7 is a schematic drawing, in perspective, of a "single-pane" window produced by joining four panels by means of the joining members of FIG. 3.

FIG. 4 shows two fully joined panels, with the joining member 21 in the applied position, while FIG. 7 schematically shows a window pane comprised of four joined panels.

While the above-described "single-pane" embodiment gives satisfactory service under most environmental conditions, the maintaining, with a minimum of losses, of particularly high temperature differentials might require still better insulation.

Figure 8:
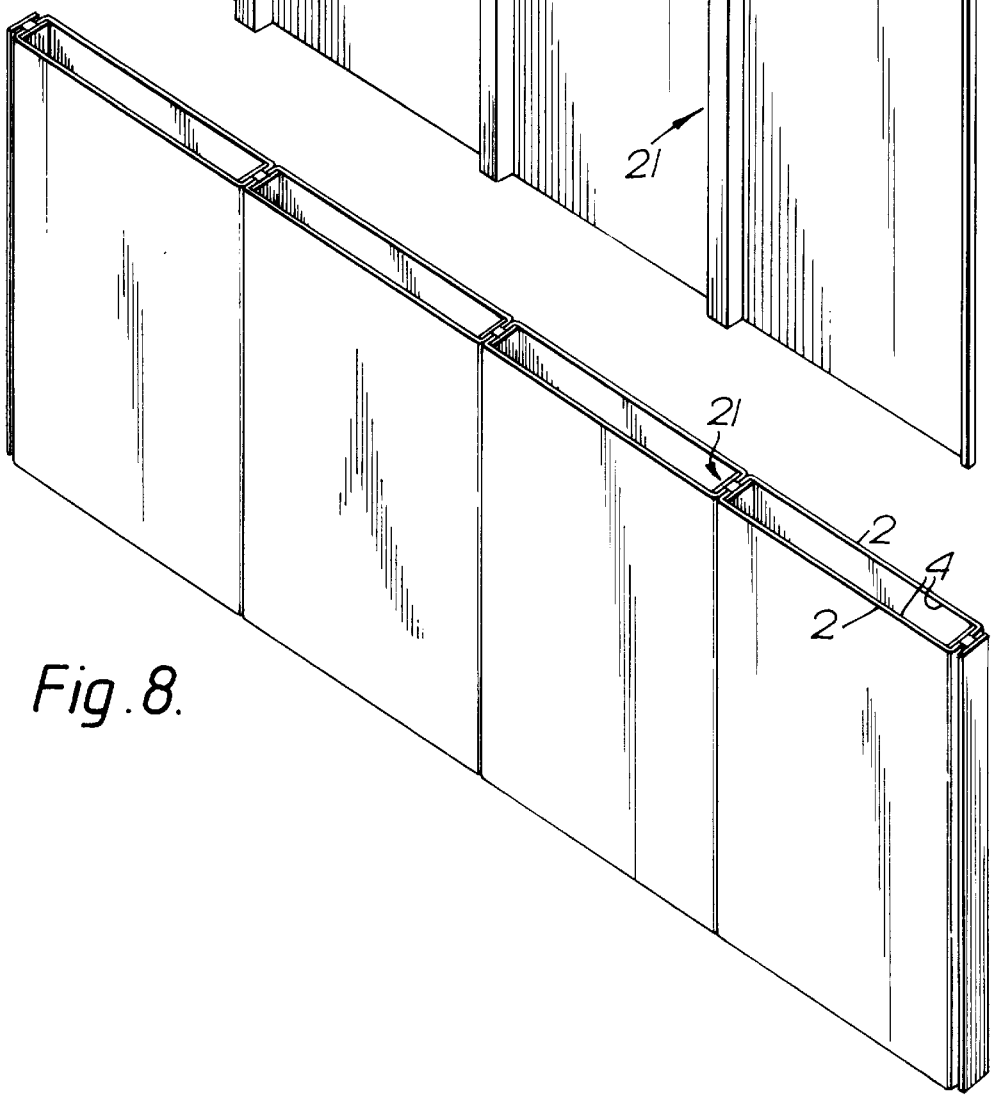
FIG. 8 is a schematic drawing, in perspective, of a "double-pane" window produced by joining four pairs of panels by means of the joining members of FIG. 5.

Such superior insulation is provided by a "double-pane" window arrangement, using the panels according to the invention, in conjunction with another embodiment of the joining member 21. This embodiment, shown in FIG. 5, is in the form of a hollow, extruded rail of a twin-U-shaped cross section comprising a mid-portion 30 and two pairs of wing portions, 24 and 24', one pair on each side of the midportion 30. The detent means 16 on the inside of the wing portions are identical in shape and function to those of the embodiment of FIG. 3. FIG. 6 shows such a twin joining member 21 in the applied position, while FIG. 8 schematically shows a "double-pane" comprised of four pairs of panels.

Although in the above-described embodiments the angle included between the major surfaces 2 and 4, and the outside faces 14 of the flanges 12 is 90°, the single panels comprising a window surface thus lying in a common plane, embodiments can be envisaged in which this angle will be other than 90°. In cross section, such panel assemblies will therefore describe polygons or parts thereof. Such polygons might even be made to approximate circles or circular arcs, if the width of the single panel is sufficiently small relative to the radius of such a circle arc.

FIGS. 9 and 10 illustrate two additional embodiments which dispense with the joining member 21, as the joining flanges of each panel unit of these two embodiments are male and female respectively, each flange engaging and locking onto its opposite flange type on the adjacent panel unit.

There is seen in FIG. 9 a male-type flange 32 normally projecting from one edge of the panel unit and provided with tooth-like detent means 16 on both of its faces. To the other edge there is attached a female-type flange 34 having a substantially U-shaped cross section including two wing portions 24, the inside of which is provided with detent means 26 engageably matching the detent means 16 of the flange 32 of an adjacent panel unit. Panels of this type are simply joined by making the male and female-type flanges engage their respectively opposite types in an adjacent panel unit.

The embodiment shown in FIG. 10 has also two flanges, a male-type flange 32 and a female-type flange 34 which, however, include an angle of 90°, the male flange 32 extending in a plane substantially parallel to the general plane of the panel. The male-type flange 32 is provided with tooth-like detent means 16. The female-type flange 34 is provided with a slot 36 extending in a plane substantially perpendicular to the major surfaces of the female flange 34, which slot 36 has a profile axis substantially aligned with the profile axis of the male flange 32, and the inside faces of which slot 36 are constituted by tooth-like detent means 26 engageably matching the detent means 16 of the flange 32 of an adjacent panel unit. Joining of the panel units according to this embodiment is analogous to the joining of the previous embodiment.

Although the embodiments of FIGS. 9 and 10 are primarily intended for single-pane windows, they are by no means limited to this kind of use. Two single-pane surfaces assembled from these embodiments could be arranged, e.g., in the manner of the above-mentioned U-glass windows, to produce a double-pane window.

While the panel unit according to the invention is primarily meant to serve for light-transmitting wall or roof portions and is therefore designed to be made of a transparent or at least translucent plastic, the special properties of these panels such as their thermal (as well as acoustic) insulation effect, the ease with which larger panel surfaces are assembled, and their relatively low cost, might suggest their use also for nontransparent walls, partitions, etc. in which case they could of course be made of an opaque material.

FIGS. 11 to 18 illustrate a mounting arrangement for single-and double-pane units, advantageously used under conditions of heavier winds.

There is seen in FIGS. 11 and 12 a plastic reinforcing rail 40 consisting of a base 42 and two wings 44 and 46, the distance a between which equals the thickness of the panel, which can thus be pushed between the wings 44 and 46. The length of rail 40 equals the width of the panel, including the joining flanges 12 (FIG. 1). The wing 44 is shortened, to make room for the flanges 12 as well as for the wing portion 24 of the joining member 21 (FIG. 3). At two or three points along the rail 40, rectangular windows 48 are provided, through which special fastening pegs 50 are forced into conveniently located sub-spaces 10 (FIG. 1) of the panel. These pegs 50 consist of a shaft 52 and a base 54 (FIGS. 13 and 14), and are provided with barb-like teeth 56 which make for a secure joint between the rails 50 and the panel, each of which panels is provided with two rails, a bottom rail and a top rail.

Figure 15:
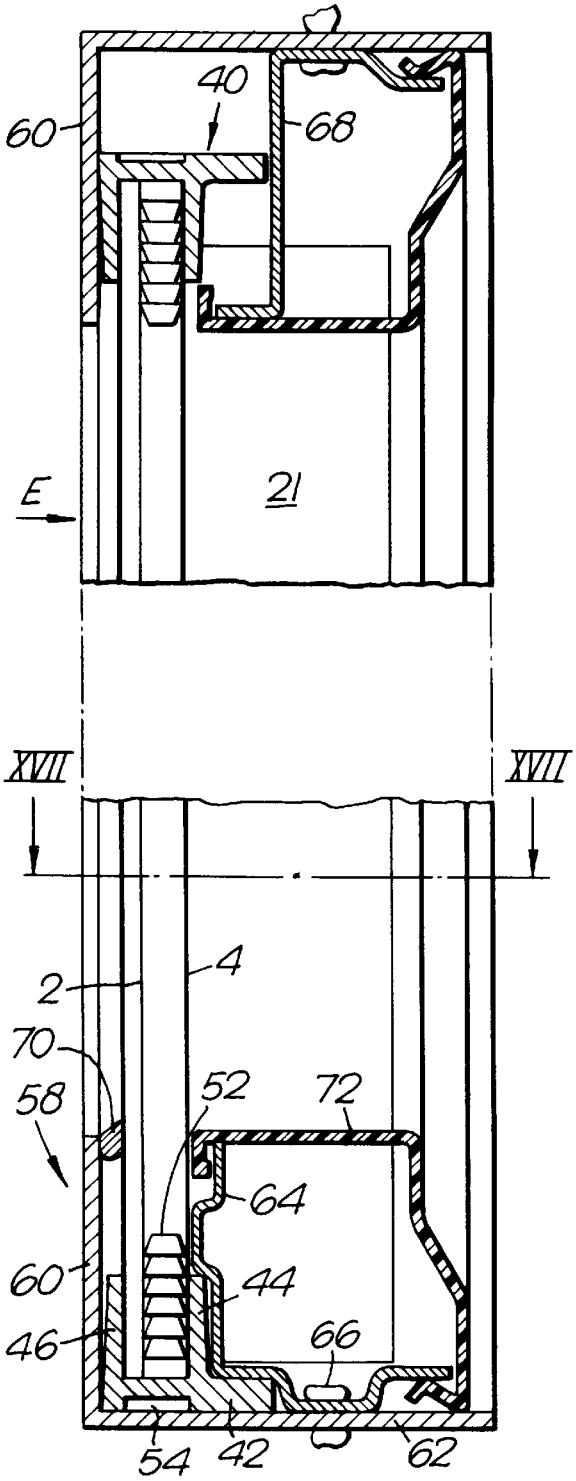
FIG. 15 is a longitudinal cross section through a single-pane mounting frame, with the panel in position.

The fully assembled mounting of a single-pane window according to the invention is shown in FIG. 15. The basic frame 58 is made of an alluminum L-profile, having a short leg 60 and a long leg 62, the exterior face of the window being indicated by arrow E. The previously prepared panel-and-reinforcing-rail units are introduced into the frame 58 and, on three sides, held against the short leg 60 of the frame profile by a plurality of special retaining pieces 64, made of steel-sheet stampings and riveted to the long frame leg 62 by means of blind rivets 66 (See also FIG. 17). It is clearly seen that, along the bottom section of the frame 58, these pieces 64 not only push the rail 40 against the short frame leg 60, but also hold it down against the long leg 62. Different retaining pieces 68 are used on the fourth, top, side of the frame 58.

These pieces 68 only press the upper rail 40 against the short leg 60, and do not interfere with a possible vertical motion of the rail 40. This "floating" feature takes care of the thermal expansion and contraction of the panels. On the exterior face of the window, the gap between the panel surface 2 and the frame leg 60 is sealed by means of a caulking compound 70. Towards the interior, the various mounting and clamping fixtures are covered up by a trimming made of a plastic profile 72 which, as can be seen in FIG. 15, snaps over, and is retained by, portions of the retaining pieces 64 and 68. Cutouts must be provided in the horizontal trimming profiles 72 for the joining members 21 to pass.

Figure 16:
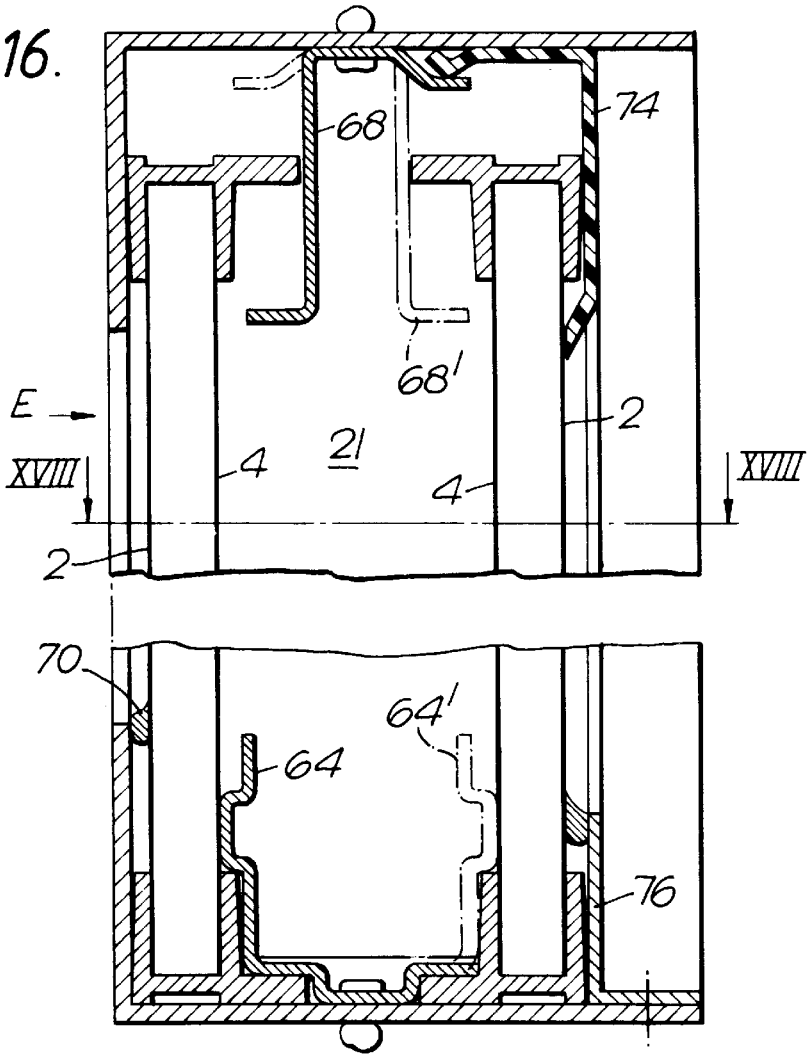
FIG. 16 is a similar cross section through a double-pane mounting frame, with the panels in position.

The double-pane mounting of FIG. 16, its exterior face indicated by arrow E, is fairly analogous in its design, except that the retaining pieces 64 and 68 alternate between a left-hand position (64,68) and a right-hand position (64',68') and the trimming 74 is used only on top, aluminum profiles 76 and 78 (FIG. 18) being used on the other sides. For smaller windows and mild environmental conditions, it is sometimes possible to dispense with the reinforcing rail of the interior panel, which is then held in position merely by the common joining member 21 attached to the exterior panel. In this case, the trimming profile 74 is used also below, the lower edge of the interior panel resting on the inside surface of the shorter leg of the trimming profile 74.

Figure 17:
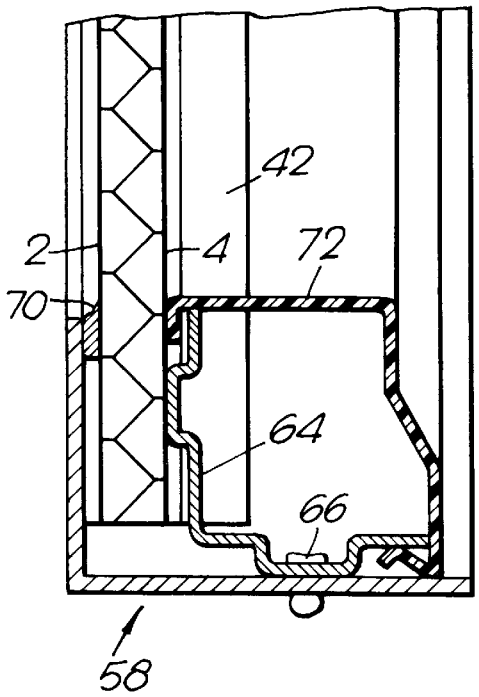
FIG. 17 is a partial view, in cross section along plane XVII—XVII of FIG. 15, of the single-pane frame of FIG. 15.
Figure 18:
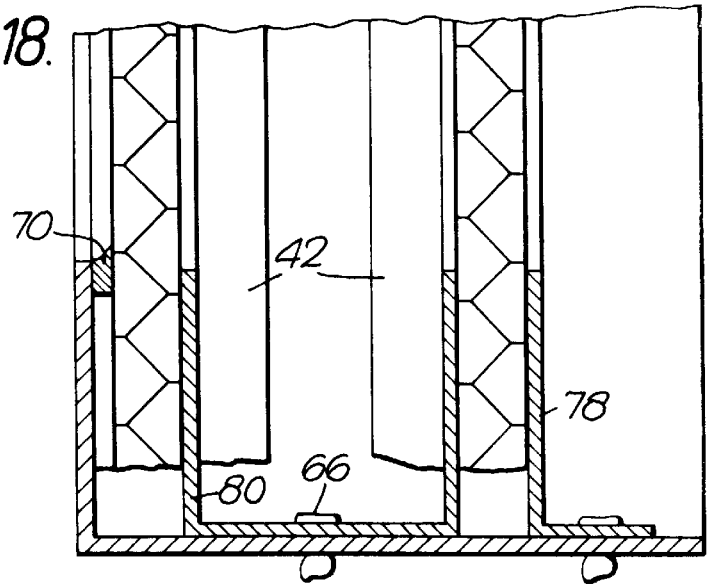
FIG. 18 is a partial view, in cross section along plane XVIII—XVIII of FIG. 16, of the double-pass frame of FIG. 16.

A further difference with respect to the single-pane embodiment of FIGS. 15 and 17 can be seen in FIG. 18, in which, on the two upright portions of the frame 58, the staggered retaining pieces 64, 64' have been replaced by a continuous U-shaped channel profile 80.

From the foregoing description, it will be evident to those skilled in the art that the invention is not limited to the details of the foregoing illustrative embodiments and that the present invention may be embodied in other specific forms without departing from the essential attributes thereof, and it is, therefore, desired that the present embodiments be considered in all respects as illustrative and not restrictive, reference being made to the appended claims, rather than to the foregoing description, in which it is intended to claim all modifications coming within the scope of the invention.

What is claimed is:

1. An extruded, modular panel unit for the construction of wall-surface portions, [including] *especially of* light transmitting wall surface portions, comprising at least two sheet-like major surfaces interconnected and spaced apart by a plurality of the ribs dividing the space delimited by said major surfaces into a plurality of subspaces, [wherein a joining flange, extending in the direction of extrusion, projects at an angle from, and beyond, an outside face of one of said major surfaces, at each extruded edge of said panel unit, wherein, in cross section, said sheet-like major surfaces and said ribs form a truss-like structure of which] said major surfaces [constitute] *constituting* the chords and said ribs [constitute] *constituting* the webs, and wherein:

(*a*) *each panel has joining flanges which extend in the direction of extrusion and are located at each as-extruded edge of the panel unit, and project from one and the same major surface;*

(*b*) each of said joining flanges has an outside [and] *as well as* an inside face, *the outside face of* each [face being adapted to] *flange serves to make* contact *with* a [corresponding] *similar* face of a flange of an adjacent panel unit*; and*

(*c*) *inside face of each of said joining flanges is provided with tooth-like first detent means for facilitating the joining of two connecting flanges of at least one pair of adjacent panel units.*

2. The panel unit as claimed in claim 1, [wherein said web-like] *in which the* ribs zigzag between [said] *the* major surfaces, and *the zigzagging ribs* are connected to [said] *the* major surfaces [via] *by* relatively short auxilliary ribs [extending] *which extend* from the inflection points of said zigzagging web-like ribs to the respectively [nearest] *nearer* one of said major surfaces.

3. The panel unit as claimed in claim 1, wherein said flanges project from the [the edges of said panel unit] *the said major surface* at a substantially right angle.

[4. The panel unit as claimed in claim 1, wherein the inside faces of said flanges are provided with tooth-like, first detent means.]

5. The panel unit as claimed in claim 1, [wherein said unit is further provided with at least one, separate,] *further comprising* a joining member [adapted to be pushed over the contacting flanges of at least one pair of adjacent panel units, effecting the joining thereof] *in form of an extruded rail of a substantially U-shaped cross section comprising a base portion and two wing portions, the inside of which wing portions is provided with tooth-like second detent means engageably matching said first detent means of said flanges, both detent means being shaped and oriented in such a way as to facilitate application of said joining member, while offering resistance to the removal of said member once applied.*

6. The panel unit as claimed in claim [5] *1*, wherein said joining member is in the form of an extruded rail of a

[substantially] *twin*-U-shaped cross section comprising a [base] *mid*portion and two *pairs of* wing portions, [the inside of which wing portions is provided with tooth-like second detent means engageably matching said first detent means of said flanges, both detent means being shaped and oriented in such a way as to facilitate application of said joining member, while offering resistance to the removal of said member once applied] *one pair on each side of said mid-portion.*

[7. The panel unit as claimed in claim 1, wherein the outside faces of said flanges are serrated.]

[8. The panel unit as claimed in claim 1, wherein the outside faces of said flanges are provided with a groove of a substantially semicircular cross section, which groove, in conjunction with a similar groove in the flange of the adjacent panel unit, constitutes a decompression chamber.]

[9. The panel unit as claimed in claim 5, wherein said joining member is in the form of an extruded rail of a twin-U-shaped cross section comprising a midportion and two pairs of said wing portions, one pair on each side of said midportion.]

10. The panel unit as claimed in claim 1, further comprising [at least one] *a* reinforcing rail slid over [the] *at least one* transverse edge of said panel and fixedly attached thereto by means of pegs forced into at least one of said subspaces, a frame in which one of [the] *said transverse* panel edges is fixedly held by means of a first type of retaining pieces [attachable] *attached* to said frame, the other *transverse* panel edge being slidingly held by a second type of retaining pieces, allowing for thermal expansion and contraction of said panel unit, and trimming profiles [attachable] *attached* to said retaining pieces [for the covering thereof] *to cover said retaining pieces.*

[11. The panel unit as claimed in claim 1, wherein said joining flanges essentially project transversely outwardly from said major surface of said panel unit.]

[12. The panel unit as claimed in claim 1, wherein the panel unit has an axis perpendicular to the major surfaces of said panel unit and located approximately mid-way between said joining flanges, and wherein said panel unit is symmetrical about said axis.]

[13. The panel unit as claimed in claim 1, wherein longitudinal edges of said major surfaces are joined by edge members, and wherein the outside faces of said joining flanges are essentially coplanar with said edge members.]

[14. The panel unit as claimed in claim 1, wherein each outside face is adapted to contact a corresponding outside face of a flange of an adjacent panel unit.]

* * * * *